June 5, 1923.
J. STETTNER
COMB CLEANER
Filed May 18, 1922
1,457,757
2 Sheets-Sheet 1
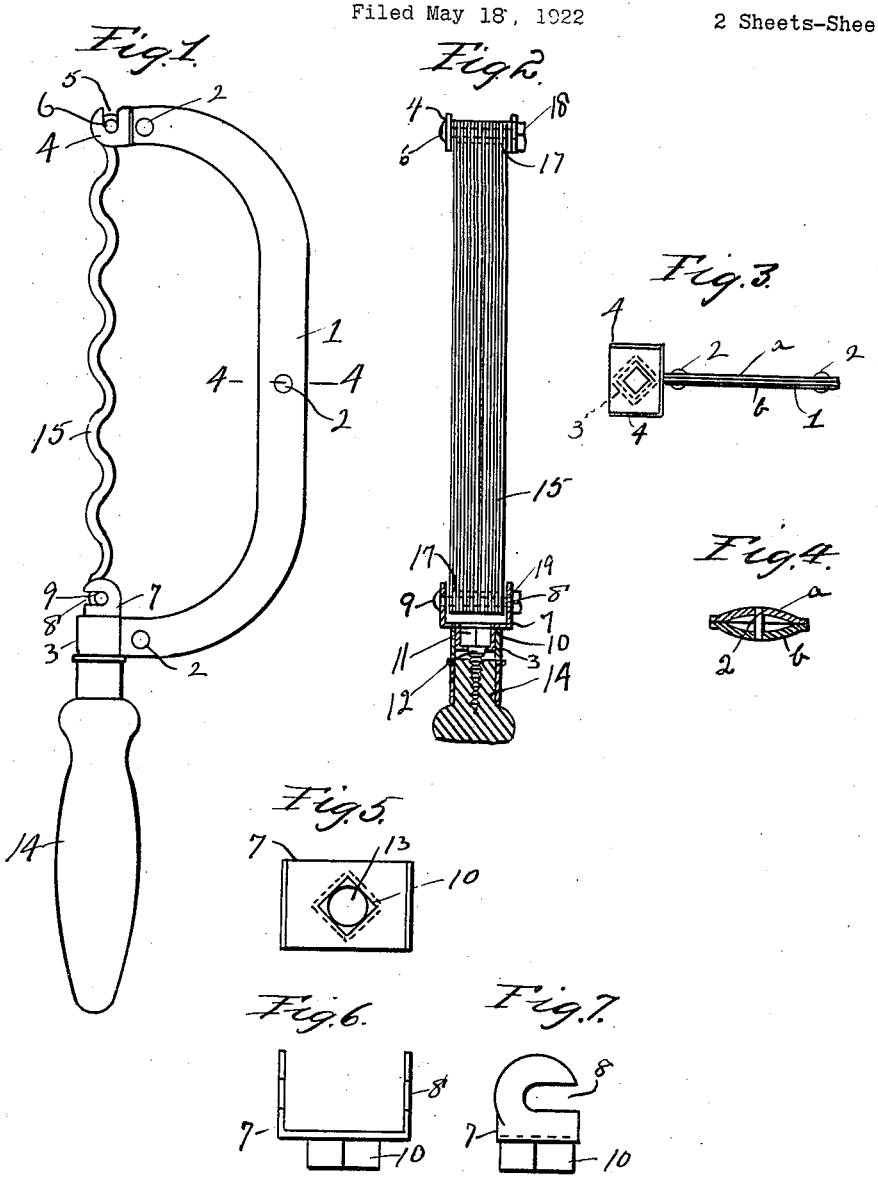
Inventor
John Stettner
By W. W. Williamson

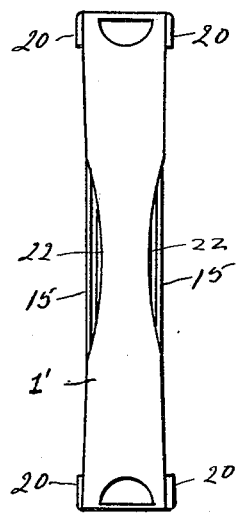
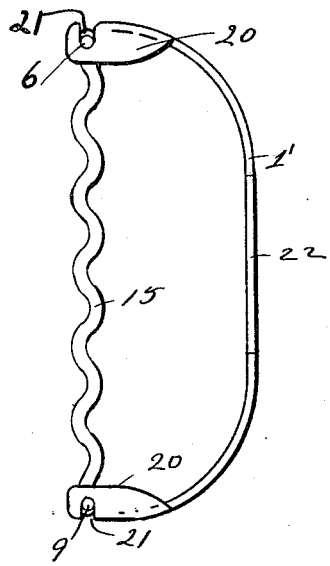
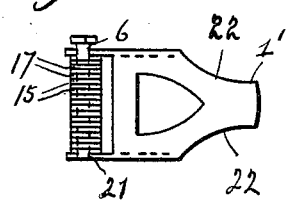
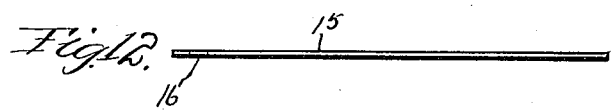

Patented June 5, 1923.

1,457,757

UNITED STATES PATENT OFFICE.

JOHN STETTNER, OF PHILADELPHIA, PENNSYLVANIA.

COMB CLEANER.

Application filed May 18, 1922. Serial No. 561,969.

*To all whom it may concern:*

Be it known that I, JOHN STETTNER, a citizen of the United States, residing at Philadelphia, in the county of Philadelphia and State of Pennsylvania, have invented new and useful Improvements in a Comb Cleaner, of which the following is a specification.

My invention relates to new and useful improvements in comb cleaners, and has for its object to provide an exceedingly simple and effective device of this description by the use of which a comb may be quickly and thoroughly cleaned.

A further object of my invention is to so construct such a device that the blades thereof may be readily attached to the frame or removed therefrom.

A still further object of my invention is to so construct the frame and the parts carried thereby as to provide for putting sufficient tension upon the blades to hold them comparatively rigid and yet permit a certain sidewise flexibility to facilitate the adaption thereof to any spacing of the comb teeth.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a side view of a comb cleaner made in accordance with one form of my invention.

Fig. 2, is a front edge view of Fig. 1, a portion of the handle being broken away.

Fig. 3, is an end view of the holder the blades being removed.

Fig. 4, is a section at the line 4—4 of Fig. 1.

Fig. 5, is an enlarged face view of the adjustable yoke.

Fig. 6, is an edge view of Fig. 5.

Fig. 7, is a side view of Fig. 5.

Fig. 8, is a plan view of a slightly modified form of my invention.

Fig. 9, is a side view of Fig. 8.

Fig. 10, is an end view of Fig. 8.

Fig. 11, is an enlarged detail side view of a portion of one of the blades.

Fig. 12, is an edge view of Fig. 11.

In carrying out my invention as embodied in Figs. 1 to 7 inclusive 1 represents the frame or holder of the devices which in practice I make in two halves *a* and *b*, each half being stamped up so that when they are secured together by the rivets 2 the sides of the holder will be bowed outward as clearly shown in Fig. 4. This strengthens and stiffens the holder and admits of its being made of light weight material.

Each of the halves of the holder are so formed that when placed together a square socket 3 is produced at one end of the holder while at the opposite end is a stationary yoke 4. The ends of this yoke are slotted as indicated at 5 for the reception of rod 6 for the purpose hereinafter explained.

7 represents the adjustable yoke the ends of which are slotted as indicated at 8 to receive the ends of the rod 9 and this yoke has formed therewith a hub 10 which is square in cross section and hollowed to form a socket for the reception of the bolt head 11; the bolt 12 carrying said head extends through the hole 13 in this hub and has threaded thereon the handle 14 said handle being of any convenient shape for manipulating the device.

15 represents the cleaning blades having the holes 16 in each end thereof, said holes being for the passage of the rods 6 and 9 so that the blades may be strung upon said rods. In placing these blades on the rods thin spacing washers 17 are placed between the blades so as to separate the latter in order that they may readily enter the spaces between the teeth of the comb to be cleaned, as will be readily understood.

In practice after the blades have been spaced upon the rods 6 and 9 the rod 6 is inserted in the slots 5 while the rod 9 is inserted in the slots 8, when by the revolving of the handle 14 in the proper direction the bolt 12 will be drawn inward drawing the yoke 7 in the same direction thereby putting the proper tension upon the blades; the square hub 11 sliding within the square socket 3 preventing the turning of the yoke 7.

Each of the blades 15 are made of thin sheet material and are of serpentine outline so that when they are passed between the teeth of a comb a rising and falling movement will be given thereto to facilitate the removal of all foreign matter from said comb.

The rods 6 and 9 may have the nuts 18 and 19 threaded upon the ends thereof respectively for preventing their accidental removal.

In Figs. 8 and 10 inclusive I have shown a slightly modified form of my invention in which the frame or handle 1' is made of a single piece of sheet metal so stamped and bent as to produce a bow shaped handle having the flanges 20 formed therewith, said flanges having the slots 21 therein for the reception of the rods 6 and 9.

When this construction is used the blades are spaced upon the rods 6 and 9 as above described and the ends of said rods are hooked within the slots 21, the bow shaped section of the handle having sufficient resiliency to permit the inward movement of the ends thereof to accomplish this result. After the rods have been hooked in the slots this springing action of the frame or holder will maintain sufficient tension upon the blades to keep them taut and yet allow sufficient sidewise springing of said blades to permit them to accommodate themselves to the various spacing of the teeth of the comb.

The bow shaped section of the handle 19 has cut away portions 22 to accommodate the hand of the operator when grasping the device for use.

Of course I do not wish to be limited to the exact details of construction as herein shown as these may be varied within the limits of the appended claims without departing from the spirit of my invention.

Having thus fully described my invention what I claim as new and useful is:—

1. As a new article of manufacture a comb cleaner comprising a bow-shaped holder, yokes carried by each end of said holder and a series of spaced blades the ends of which are secured in said yokes.

2. A comb cleaner comprising a bow-shaped holder, a yoke carried by each end of said holder, rods carried by said yokes and serpentine shaped blades placed upon the said rods.

3. A comb cleaner comprising a bow-shaped holder, a stationary yoke formed upon one end of said holder, a squared socket formed upon the opposite end of said holder, an adjustable yoke, a squared hub formed with said yoke adapted to fit within said socket, a threaded bolt, the head of which fits within said hub, a handle threaded upon said bolt, rods carried by the yokes, and cleaning blades spaced upon said rods.

4. In a comb cleaner a bow-shaped holder, a stationary yoke formed upon one end of said holder, an adjustable yoke attached to the opposite end of said holder, thin serpentine blades extending between said yokes, and means for exerting lengthwise strain upon said blades.

5. In a comb cleaner a holder comprising two bow-shaped concave halves secured together, said holder having a yoke at one end thereof, and a squared socket at the opposite end thereof an adjustable yoke having means registering with the socket, blades, and means to detachably connect said blades to the yokes.

6. A comb cleaner comprising a resilient bow-shaped holder, yokes formed upon each end of said holder by flanges bent at right angles thereto, said yokes having slots therein, rods adapted to fit within said slots, and thin serpentine shaped blades placed upon said rods.

In testimony whereof, I have hereunto affixed my signature.

JOHN STETTNER.